(12) United States Patent
Zhang et al.

(10) Patent No.: US 10,339,318 B2
(45) Date of Patent: Jul. 2, 2019

(54) SEMICONDUCTOR MEMORY SYSTEM AND OPERATING METHOD THEREOF

(71) Applicant: SK hynix Inc., Gyeonggi-do OT (KR)

(72) Inventors: Yibo Zhang, San Jose, CA (US); Andrei Konan, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 211 days.

(21) Appl. No.: 15/345,169

(22) Filed: Nov. 7, 2016

(65) Prior Publication Data

US 2018/0129809 A1 May 10, 2018

(51) Int. Cl.
G06F 21/57 (2013.01)
G06F 9/4401 (2018.01)
H04L 9/14 (2006.01)
H04L 9/30 (2006.01)
H04L 9/32 (2006.01)
G06F 21/79 (2013.01)
G06F 21/44 (2013.01)

(52) U.S. Cl.
CPC .......... G06F 21/575 (2013.01); G06F 9/4406 (2013.01); G06F 21/572 (2013.01); G06F 21/79 (2013.01); H04L 9/14 (2013.01); H04L 9/30 (2013.01); H04L 9/3247 (2013.01); G06F 21/44 (2013.01)

(58) Field of Classification Search
CPC ........ G06F 21/575; G06F 21/44; G06F 21/62; H04L 9/14; H04L 9/3247
See application file for complete search history.

(56) References Cited

U.S. PATENT DOCUMENTS

| | | | | |
|---|---|---|---|---|
| 7,353,541 | B1* | 4/2008 | Ishibashi | G06F 21/10 348/E7.056 |
| 2007/0204078 | A1* | 8/2007 | Boccon-Gibod | G06F 21/10 710/54 |
| 2014/0196134 | A1* | 7/2014 | Yamaguchi | G06F 21/44 726/7 |
| 2016/0378990 | A1* | 12/2016 | Goodman | G06F 21/572 726/19 |

* cited by examiner

Primary Examiner — Dao Q Ho
(74) Attorney, Agent, or Firm — IP & T Group LLP

(57) ABSTRACT

A semiconductor memory system and an operating method thereof includes: a one-time-programmable memory device storing at least a customer identification (ID) identifying a customer; a memory device; and a memory controller including a processor, and coupled to the memory device, containing instructions executed by the processor, and suitable for authenticating whether a program is authorized by a controller provider for the customer in a first-level signature authentication, in accordance with a customer image format, authenticating whether the program is authorized by the customer in a second-level signature authentication, in accordance with a program image format, after the first-level signature authentication is passed, when the customer image indicates the second-level signature authentication, wherein the program image format is different than the customer image format, storing the program into the memory device after the first-level signature authentication and second-level signature authentication are passed, and executing the program after the program is authenticated.

19 Claims, 6 Drawing Sheets

SEMICONDUCTOR MEMORY SYSTEM AND OPERATING METHOD THEREOF

BACKGROUND

1. Field

Exemplary embodiments of the present disclosure relate to a semiconductor memory system and an operating method thereof.

2. Description of the Related Art

The computer environment paradigm has been shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, such as a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid-state drive/solid-state disk (SSD).

The SSD can include flash memory components and a SSD controller. The SSD controller can be also referred as a processor, which includes the electronics that bridge the flash memory components to the SSD input/output (I/O) interfaces. The SSD controller can include an embedded processor that can execute functional components, such as firmware. The SSD functional components are device specific, and in most cases can be updated.

Thus, there remains a need for a semiconductor memory system and operating method thereof for a secure booting. In view of the ever-increasing need to improve performance and security, it is more and more critical that answers be found to these problems. Solutions to these problems have been long sought but prior developments have not taught or suggested any solutions and, thus, solutions to these problems have long eluded those skilled in the art.

SUMMARY

Embodiments of the present disclosure are directed to a semiconductor memory system and an operating method thereof capable of improving the performance and security of a SSD memory system.

An operating method of a semiconductor memory system comprising: storing at least a customer identification (ID) identifying a customer in a one-time-programmable memory device; providing a memory device; coupling the memory device to a memory controller including a processor, the memory controller contains instructions executed by the processor; authenticating whether a program is authorized by a controller provider for the customer in a first-level signature authentication, in accordance with a customer image format; authenticating whether the program is authorized by the customer in a second-level signature authentication, in accordance with a program image format, after the first-level signature authentication is passed, when the customer image indicates the second-level signature authentication, wherein the program image format is different than the customer image format; storing the program into the memory device after the first-level signature authentication and second-level signature authentication are passed; and executing the program after the program is authenticated.

A semiconductor memory system comprising: a one-time-programmable memory device storing at least a customer identification (ID) identifying a customer; a memory device; and a memory controller including a processor, and coupled to the memory device, containing instructions executed by the processor, and suitable for authenticating whether a program is authorized by a controller provider for the customer in a first-level signature authentication, in accordance with a customer image format, authenticating whether the program is authorized by the customer in a second-level signature authentication, in accordance with a program image format, after the first-level signature authentication is passed, when the customer image indicates the second-level signature authentication, wherein the program image format is different than the customer image format, storing the program into the memory device after the first-level signature authentication and second-level signature authentication are passed, and executing the program after the program is authenticated.

DETAILED DESCRIPTION

Figure 1:
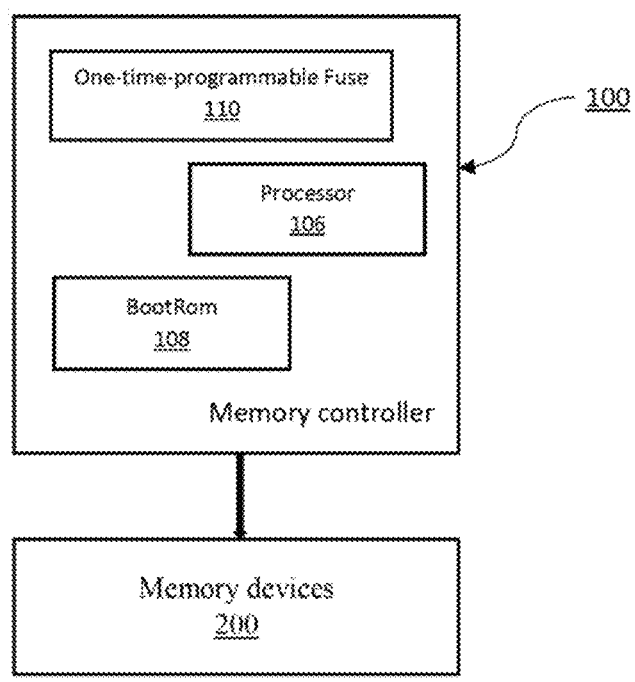
FIG. 1 is a top level block diagram schematically illustrating a semiconductor memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A memory system controller provider, such as a SSD controller provider, usually needs to support different customers. Not like a consumer SSD, which has very common features for all customers, for enterprise SSD, each customer can have its own unique features different from other customers to make it in advantage position in the market and meet its own specific requirements in enterprise environment. Those features are implemented in the functional components inside a SSD controller. One customer's SSD should reject the other customers SSD even when they use the same SSD controller. Some customers go even further and want to control their own official functional components release, such as firmware release, beyond what is provided by the SSD controller provider, to make sure the official firmware release is from itself.

Usually, the SSD controller booting includes two steps, BootRom and main firmware. The BootRom can include a group of registers inside the SSD controller and cannot be changed after the SSD controller is built. The BootRom executes a minimum controller initialization and accomplishes the tasks of loading the main firmware to the SSD, which has full SSD features of one specific customer when the main firmware is executed.

As to the memory authentication, such as a SSD authentication, there are numerous methodologies and algorithms to authenticate the main firmware. The most popular method can utilize a digital signature algorithm, with a private kay and a public key.

In order to achieve the exclusiveness of one customer's firmware running on the SSD, the SSD controller needs to provide a secure booting mechanism to distinguish the different customers and have a way to do the authentication when a new firmware is provided for upgrade.

In the embodiments of the present invention, a multi-level signature authentication system, and the operating method thereof, are designed to achieve the requirements of the secure booting for the SSD, to prevent the unauthorized or malicious firmware running from the SSD.

The SSD can include a SSD controller, and SSD memory devices, such as flash memory components. The SSD controller can include a processor and controller built-in memory devices, wherein the controller built-in memory devices can store the programs or firmware executed by the processor. The controller built-in memory devices can comprise one-time-programmable memories, such as a one-time-programmable Fuse, and a BootRom.

The multi-level signature authentication system can implement a first-level signature authentication, a second-level signature authentication, and a repeated first-level signature authentication. The first-level signature authentication can authenticate that the main firmware is authorized or released from the controller provider and is manufactured for a specific customer. Typically, the first-level signature authentication can be performed by the controller provider. The second-level signature authentication can authenticate that the main firmware is released by the specific customer. Typically, the second-level signature authentication can be performed by the controller provider or the customer. The repeated first-level signature authentication can authenticate that the main firmware is released or authorized from the controller provider, after a new customer public key and a new customer signature are provided and authenticated. Typically, the repeated first-level signature authentication can be performed by the controller provider.

In order to implement the multi-level signature authentication system, for each level of the signature authentication, a signing procedure and an authentication procedure are utilized with a matching key pair including a private key and a public key. In the signing procedure, the private key can be encrypted into a digital signature with encrypt signature algorithm. In the authentication procedure, the public key can be utilized to decrypt the digital signature with decrypt signature algorithm.

In the first-level signature authentication, a controller key pair including a controller private key and a controller public key is provided. The controller private key can be encrypted into a controller signature during a controller signing procedure. The controller public key can be used to decrypt the controller signature during a controller authentication procedure. In the second-level signature authentication, a customer key pair including a customer private key and a customer public key is provided. The customer private key can be encrypted into a customer signature during a customer signing procedure. The customer public key can be used to decrypt the customer signature during a customer authentication procedure.

Parties with no prior security arrangement can exchange confidential information with the matching key pair, since the private key need not be sent through a secure channel. Because the matching key pair is produced by a key generation algorithm, deducing the private key from the public key is not computationally feasible. RSA encryption is an example of public key cryptography, wherein RSA refers to one practical public-key cryptosystems, and is made of the initial letters of the surnames of Ron Rivest, Adi Shamir, and Leonard Adleman, who first publicly described the algorithm.

To provide a full solution to achieve the secure booting of the SSD using the multi-level signature authentication, the following elements and the respective firmware thereof can be implemented in the SSD controller.

1) One-Time-Programmable Fuse to hold the information to identify the customer.
2) Signing server for the firmware signing process.
3) BootRom and main firmware to implement the firmware authentication.
4) Main firmware authentication to support new firmware upgrade or/and customer's key pairs update.

The one-time-programmable memory or one-time-programmable Fuse is a form of digital memory where the setting of each bit is locked by a fuse or antifuse. Data in the one-time-programmable Fuse is permanent and cannot be changed. Typically, the one-time-programmable Fuse are used to store permanent data, such as the customer ID.

The signing server is a server performing a signing procedure to create the digital signature, such as a controller signature or a customer signature.

The BootRom is a memory device in the memory controller where executable programs or instructions are stored therein for initiating the semiconductor memory devices. The main firmware are the programs configured by the instructions stored in the BootRom for implementation of the signature authentication.

During the first-level signature authentication, a controller image of a main firmware image can be authenticated with the controller signature and the controller public key, to guarantee the main firmware is authorized or released from the controller provider. The controller image can represent that the main firmware is signed by the controller provider. The customer identification (ID) of the main firmware image can be compared with the customer ID hold in the one-time-programmable Fuse. When the customer ID of the main firmware image matches the customer ID of the on-time-programmable Fuse, the main firmware can be guaranteed for the specific customer identified by the customer ID.

During the second-level signature authentication, the customer signature and the customer public key can be used to authenticate a customer image of the main firmware image, to guarantee that the main firmware is released from the specific customer identified by the customer ID in the first-level signature authentication. The customer image can represent that the main firmware is to be signed by the customer. The authenticated main firmware image can be loaded onto the SSD and further be executed when both the first-level signature authentication and the second-level signature authentication are passed.

In addition, the digital signature algorithm of the multi-level signature authentication can provide flexibility to manage the matching key pairs of the SSD controller provider or/and SSD customer. Optionally, the customer key pair can be updated if the customer private key is compromised, or the customer can choose to release the main firmware with own releasing service thereof.

Referring now to FIG. 1, therein is shown a block diagram schematically illustrating a semiconductor memory system in accordance with an embodiment of the present invention. The semiconductor memory system, such as a SSD, can include numerous components including a memory controller 100, such as a SSD controller, and semiconductor memory devices 200, such as flash memory devices. The memory controller 100 can comprise a processor 106 and controller built-in memory devices, such as a BootRom 108 and a one-time-programmable Fuse 110, for storing instructions and parameters for initial secure booting and authentication.

The memory controller 100 may control overall operations of the semiconductor memory devices 200, via a communication input/output (I/O) bus comprises command CMD, address ADDR, data DATA, power PWR, and a control signal CTRL. The control signal CTRL may include a command latch enable (CLE) signal, an address latch enable (ALE) signal, a chip enable (CE) signal, a write enable (WE) signal, a read enable (RE) signal, and so on.

The semiconductor memory device 200 may perform one or more erase, program, and read operations under the control of the memory controller 100. The semiconductor memory devices 200 may receive the command, address, and data through input/output lines from the memory controller 100. The semiconductor memory devices 200 may receive the power PWR through a power line and the control signal CTRL through a control line.

The memory controller 100 and the semiconductor memory devices 200 may be integrated in a single semiconductor device, such as the SSD or a memory card. When the ECC memory system is used in the SSD, operation speed of a host (not shown) coupled to the ECC memory system may remarkably improve. The SSD may include a storage device for storing data therein.

The memory controller 100 and the semiconductor memory devices 200 may be integrated in a single semiconductor device such as a memory card. For example, the memory controller 100 and the semiconductor memory devices 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the ECC memory system may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

The One-Time-Programmable Fuse 110 for defining and holding a customer ID can be a specific register or registers. Each customer can have a unique customer ID to distinguish from other customers. The main firmware of the SSD can use the customer ID hold in the one-time-programmable Fuse 110 to check, whether the corresponding firmware provided for releasing or upgrading is for the specific customer identified by the customer ID. The customer ID is unique and can be programmed during the manufacturing only. Once the manufacturing is completed, the customer ID cannot be changed.

BootRom 108 can execute the firmware authentication for a manufacturing tool and the main firmware. The BootRom 108 can support the manufacturing tool to program the first version of the main firmware, and load the main firmware onto the SSD when the authentication or authentications are passed. The controller public key can be embedded into the BootRom 108 during the authentication procedure.

Figure 2:
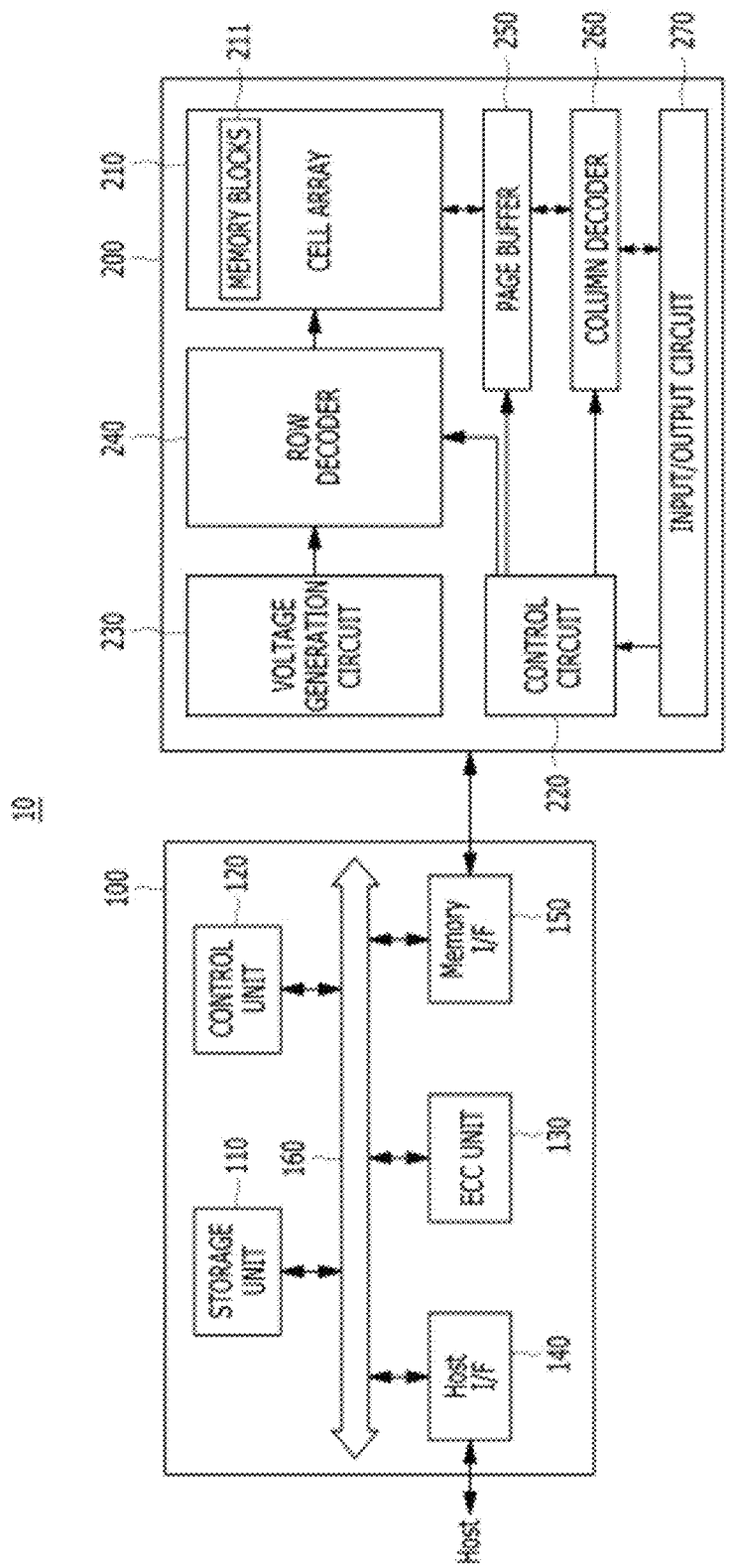
FIG. 2 is a detailed block diagram illustrating a semiconductor memory system in accordance with an embodiment of the present invention.

Referring now to FIG. 2, therein is shown a detailed block diagram illustrating an ECC memory system in accordance with an embodiment of the present invention. For example, the ECC memory system of FIG. 2 may depict the ECC memory system shown in FIG. 1. The ECC memory system may include the memory controller 100 and the semiconductor memory devices 200. The ECC memory system may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The semiconductor memory devices 200 may store data to be accessed by the host device.

The semiconductor memory devices 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory controller 100 may control storage of data in the semiconductor memory devices 200. For example, the memory controller 100 may control the semiconductor memory devices 200 in response to a request from the host device. The memory controller 100 may provide the data read from the semiconductor memory devices 200, to the host device, and store the data provided from the host device into the semiconductor memory devices 200.

The memory controller 100 may include a storage unit 110, a control unit 120, the error correction code (ECC) unit 130, a host interface 140 and a memory interface 150, which are coupled through a bus 160.

The storage unit 110 may serve as a working memory of the ECC memory system and the memory controller 100, and store data for driving the ECC memory system and the memory controller 100. When the memory controller 100 controls operations of the semiconductor memory devices 200, the storage unit 110 may store data used by the memory controller 100 and the semiconductor memory devices 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the semiconductor memory devices 200 for the read and write operations. To store the data, the storage unit 110 may include a program memory, a data memory, a write buffer, a read buffer, a map buffer, and so forth.

The control unit 120 may control general operations of the ECC memory system, and a write operation or a read operation for the semiconductor memory devices 200, in response to a write request or a read request from the host device. The control unit 120 may drive firmware, which is referred to as a flash translation layer (FTL), to control the general operations of the ECC memory system. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the semiconductor memory devices 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as a low density parity check (LDPC) code, a Bose-Chaud-huri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the memory controller 100 and the semiconductor memory devices 200 to allow the memory controller 100 to control the semiconductor memory devices 200 in response to a request from the host device. The memory interface 150 may generate control signals for the semiconductor memory devices 200 and process data under the control of the CPU 120. When the semiconductor memory devices 200 is a flash memory such as a NAND flash memory, the memory interface 150 may generate control signals for the memory and process data under the control of the CPU 120.

The semiconductor memory devices 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may pre-charge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
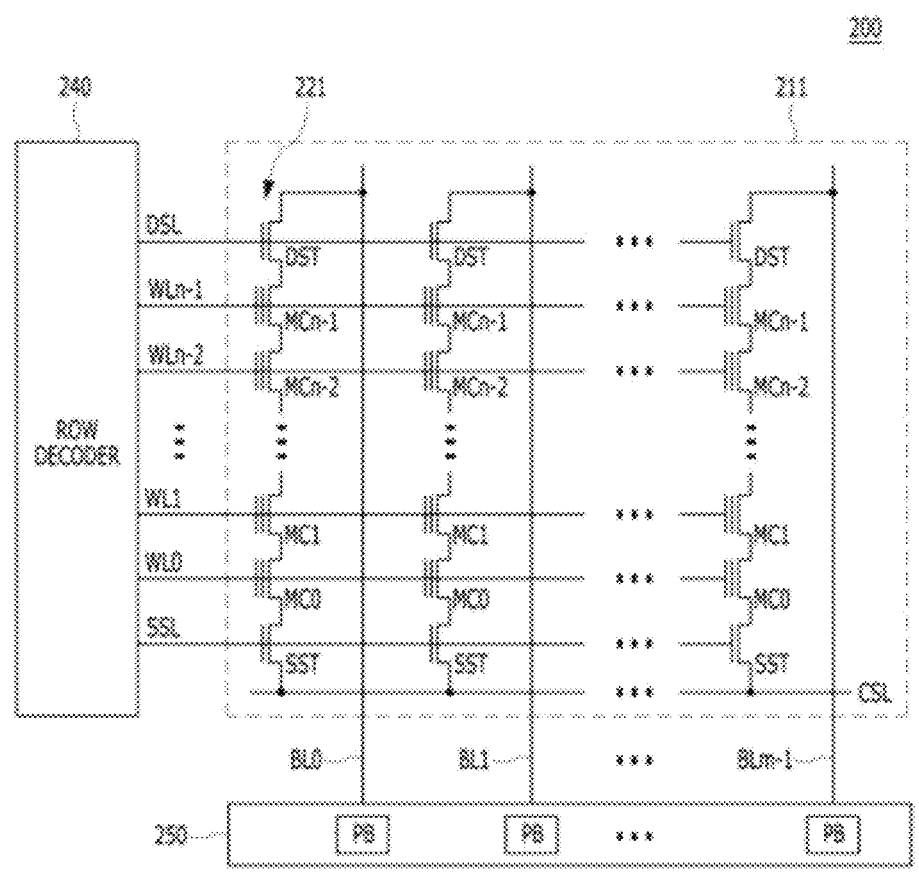
FIG. 3 is a circuit diagram illustrating a memory block of semiconductor memory devices in accordance with an embodiment of the present invention.

Referring now to FIG. 3, herein is shown a circuit diagram illustrating a memory block of semiconductor memory devices in accordance with an embodiment of the present invention. For example, a memory block of FIG. 3 may be the memory blocks 211 of the memory cell array 200 shown in FIG. 2.

The memory blocks 211 may include a plurality of cell strings 221 coupled to bit lines BL0 to BLm-1, respectively. The cell string of each column may include one or more drain selection transistors (DST) and one or more source selection transistors (SST). A plurality of memory cells or memory cell transistors may be serially coupled between the DSTs and SSTs. Each of the memory cells MC0 to MCn-1 may be formed of a multi-level cell (MLC) storing data information of multiple bits in each cell. The cell strings 221 may be electrically coupled to the corresponding bit lines BL0 to BLm-1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Figure 4:
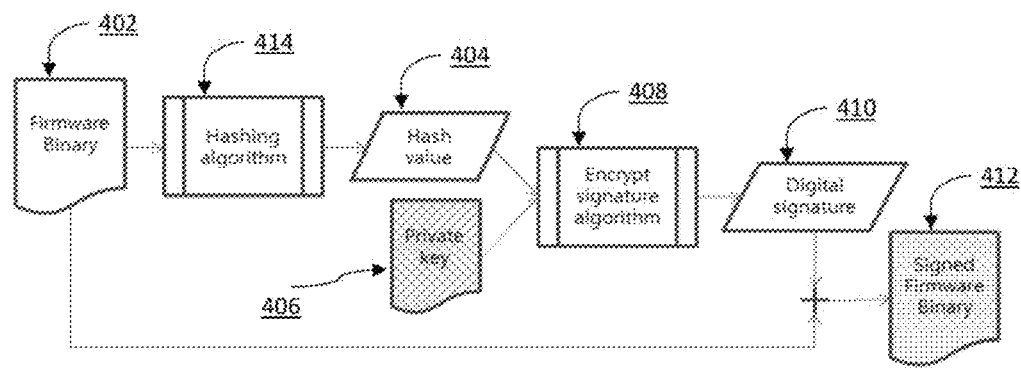
FIG. 4 is a flowchart illustrating a signing procedure of a semiconductor memory system in accordance with an embodiment of the present invention.

Referring now to FIG. 4, therein is shown a flowchart illustrating a signing procedure of a semiconductor memory system in accordance with an embodiment of the present invention. During the signing procedure, a signing server can be setup to encrypt the private key into an encrypted digital signature in the signing procedure.

Typically, the signing process can sign a message, such as an initial firmware binary 402, by computing the initial firmware binary 402's hash and encrypting a hash value 404 thereof with the private key 406, in accordance with the encrypt signature algorithm 408, to create a digital signature 410. The combination of the digital signature 410 and the initial firmware binary 402 can be the signed firmware binary 412. In the signing procedure, the initial firmware binary 402 can be referred as being "signed" with the private key 406.

A hashing algorithm 414 is a one-way hash function taking a variable-length input and producing a fixed-length output, known as a hash or the hash value 404. The hash function ensures that, if the input information is changed in any way, the output can be produced entirely different.

The controller provider can sign a controller message, by computing the initial controller message's hash and encrypting a message hash value thereof with the controller private key, in accordance with the encrypt signature algorithm 408, to create the controller signature. The combination of the controller signature and the initial controller message can be the signed controller message. In the signing procedure, the initial controller message can be referred as being "signed" with the controller private key. The controller signature can be loaded into a manufacturing tool or the main firmware.

The controller private key can be encrypted into the controller signature. The controller private key storage needs to meet customers' highest security requirement, such as Federal Information Processing Standard (FIPS) 140-2 level 3 or level 4. All customers' firmware can be signed using the said signing server by approved users or build servers.

The controller signature can be used to authenticate the controller provider's information, and also verify that the controller provider's information is intact. After the initial version of the main firmware is programmed by the manufacturing tool, if the customer wants to control the official firmware release thereof, the customer image can be provided to the customer. The customer can sign the provided customer image using own customer signing server to create a program image format or the main firmware image format as defined in FIG. 7.

The customer signing server can encrypt the customer private key into the customer image for generating the customer signature in accordance with the encrypt signature algorithm, in a similar signing procedure as in the controller signing server.

The customer signing server can sign a customer message, by computing the initial customer message's hash and encrypting a message hash value thereof with the customer private key, in accordance with the encrypt signature algorithm 408, to create the customer signature. The combination of the customer signature and the initial customer message can be the signed customer message. In the signing procedure, the initial customer message can be referred as being "signed" with the customer private key. The customer signature can be loaded into the main firmware.

The customer signature can be saved into the main firmware for the second-level authentication. If the customer does not want to control the official firmware release, the customer signing procedure is not necessary and the second-level signature authentication can be skipped.

Figure 5:
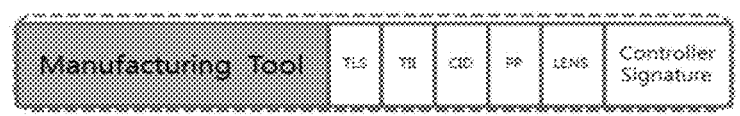
FIG. 5 is a diagram illustrating a manufacturing tool image format of a semiconductor memory system in accordance with an embodiment of the present invention.

Referring now to FIG. 5, therein is shown a diagram illustrating a manufacturing tool image format of a semiconductor memory system in accordance with an embodiment of the invention. The manufacturing tool image format can include a manufacturing tool section, followed by various bits and sections for definition of various parameters.

Two-Level Signature (TLS) bit of the manufacturing tool image format can indicate the signature authentication is one-level or two-level. During the initial programming of the main firmware by the manufacturing tool, the TLS can be set to 0 since only one-level signature authentication needs to be done by the BootRom initially.

A Test Image Indicator (TII) bit of the manufacturing tool image format can indicate the firmware mode. When the TII is 0, the main firmware release can be a production release.

When the TII is 1, the main firmware release can be test firmware release, wherein the firmware released is a test release instead of the production release.

Customer ID (CID) bits of the manufacturing tool image format can define the customer ID for the specific customer. The number of CID bits can be variable. Each CID is corresponding to one unique customer, while the controller provider can support multiple customers.

Padding Parameter (PP) and Length (LENS) for RSA bits can be used in the decrypt signature algorithm of FIG. 4. The number of PP and LENS bits can be various.

Controller Signature section can refer to the controller signature encrypted with the controller private key created in the firmware signing process of FIG. 4.

The manufacturing tool can be stored on the SOC but not saved on the semiconductor memory system or SSD. The manufacturing tool only runs inside the memory device of the SSD, such as the flash memory components.

Figure 6:
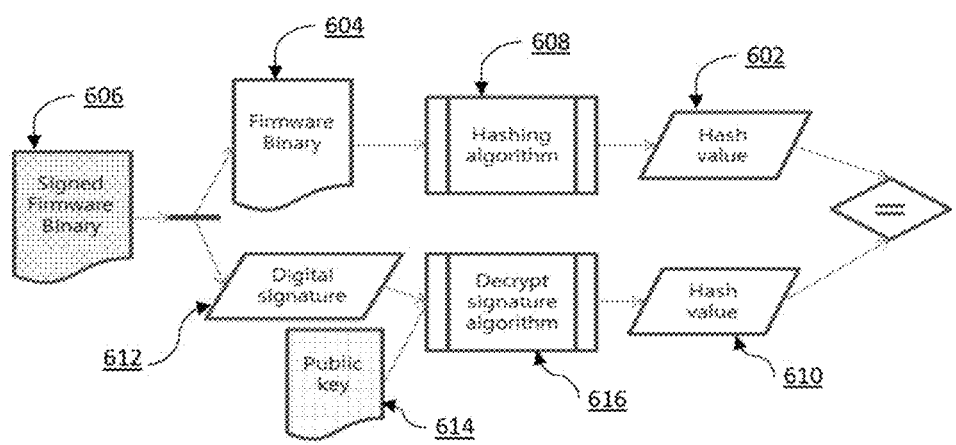
FIG. 6 is a flowchart illustrating a multi-level signature authentication procedure of a semiconductor memory system in accordance with an embodiment of the present invention.

Referring now to FIG. 6, therein is shown a flowchart illustrating a multi-level signature authentication procedure of a semiconductor memory system in accordance with an embodiment of the present invention. The controller public key can be embedded into the BootRom during the authentication procedure. The programs or instructions of the BootRom can authenticate the controller signature of the FIG. 4, and the customer ID carried in the manufacturing tool of FIG. 5.

During the signature authentication procedure, a digital signature 612 can be verified by decrypting with a public key 614. An initial hash value 602 of the initial firmware binary 604 of the signed firmware binary 606 can be computed according with a hashing algorithm 608. A decrypted hash value 610 can be computed by decrypting the digital signature 612 with the public key 614, in accordance with a decrypt signature algorithm 616. When the initial hash value 602 matches the decrypted hash value 610, the digital signature 612 can be authenticated.

In the multi-level signature authentication procedure, the controller signature can be verified by decrypting with a controller public key in the first-level signature authentication. The signed controller message can be separated into an initial controller message and the controller signature. An initial controller message's hash value can be computed according with the hashing algorithm 408. A decrypted controller signature hash value can be computed by decrypting the controller signature with the controller public key, in accordance with the decrypt signature algorithm 616. When the initial controller message's hash value matches the decrypted controller signature hash value, the controller signature can be authenticated.

In the meanwhile, the customer ID hold in the one-time-programmable Fuse can be compared with the customer ID of the manufacturing tool. If the customer ID hold in the one-time-programmable Fuse matches the customer ID of the manufacturing tool, the customer ID is verified.

Therefore, the first-level signature authentication is completed. When the customer ID and the controller signature are authenticated, the first-level signature authentication is passed. The authenticated controller signature and the customer ID can be written into the main firmware. The main firmware can be guaranteed that is authorized or released by the controller provider and for the specific customer identified by the customer ID.

The first-level signature authentication can provide security that the main firmware is authorized by the controller provider, and is for the specific customer only. The first-level signature authentication can enable the controller provider to serve multiple customers, and meet individual customer unique requirements for implementing special features thereof. The controller signature also provides non-repudiation feature, for preventing the controller provider from disclaiming the origin of the information.

After the first-level signature authentication is passed, the second-level signature authentication against the customer image can be proceeded in a similar authentication procedure of the first-level signature authentication. The customer signature can be authenticated by decrypting with the customer public key.

In the second-level signature authentication procedure, the customer signature can be verified by decrypting with a customer public key. The signed customer message can be separated into an initial customer message and the customer signature. An initial customer message's hash value can be computed according with the hashing algorithm 408. A decrypted customer signature hash value can be computed by decrypting the customer signature with the customer public key, in accordance with the decrypt signature algorithm 616. When the initial customer message's hash value matches the decrypted customer signature hash value, the customer signature can be authenticated.

The second-level signature authentication may be proceeded when the main firmware needs to be updated with a new firmware release, for enhancement of the quality of the main firmware, or with a new customer public key, because the customer private key gets compromised, or the combination thereof.

Figure 8:
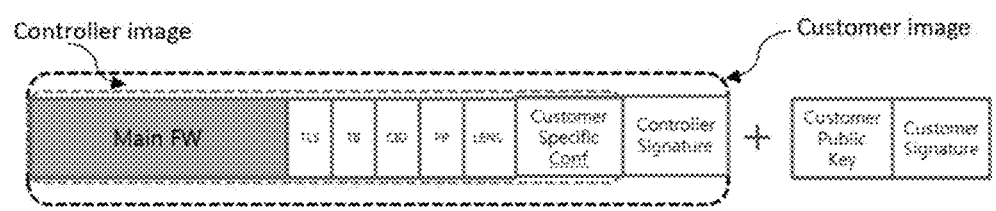
FIG. 8 is a diagram illustrating a main firmware image format saved in a semiconductor memory system in an embodiment of the present invention.

For normal new main firmware update, the Key Indicator bit of the new main firmware can be set to 0, and the customer public key previously saved in the SSD can be used to authenticate the new main firmware image, along with the Customer Signature provided in the new main firmware image. The second-level signature authentication can authenticate the customer signature with the previously saved customer public key in accordance with the decrypt signature algorithm. If the second-level signature authentication is passed, the new customer image can be saved to the SSD along with the previously saved customer public key and the new customer signature as shown in FIG. 8. The second-level signature authentication can guarantee the main firmware is released by the customer with the customer's own signing server.

If the customer wants to replace the customer key pair, the Key Indicator can be set to 1, and a new customer public key can fill in the Customer Public Key field of the new main firmware. The replacement of the customer key pair can be caused by the compromised customer private key or an addition to the new main firmware.

When the main firmware running on the SSD gets the new main firmware image with the new customer public key, the main firmware can authenticate the new customer signature with the new customer public key against the new main firmware image. If the authentication is passed, the main firmware can continue on a repeated first-level signature authentication using the controller signature and the embedded controller public key to make sure the new main firmware is authorized by the controller provider, and guarantee the new main firmware is for the specific customer by matching the Customer ID of the new firmware with the customer ID one in the one-time-programmable Fuse. If the repeated first-level signature authentication is passed, the new customer image can be saved to the SSD along with the new customer public key and new customer signature as showed in FIG. 8.

After the first-level signature authentication, the second-level signature authentication, and the optional repeated first-level signature authentication are passed, the multi-level signature authentication is accomplished and the authenticated main firmware can be saved onto the SSD and executed. The main firmware can be guaranteed is released from the controller for the specific customer, wherein the specific customer can have the customer public key and customer signature saved onto the SSD. The main firmware then can be executed safely.

Figure 7:
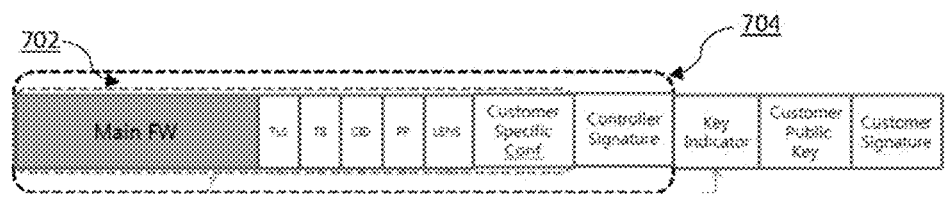
FIG. 7 is a diagram illustrating a main firmware image format of a semiconductor memory system in accordance with an embodiment of the present invention.

Referring now to FIG. 7, therein is shown a diagram illustrating a main firmware image format of a semiconductor memory system in accordance with an embodiment of the present invention. The main firmware image format can be segregated into a customer image format 702 or a controller image format 704, followed by various bits and sections for definition of parameters.

There are two signatures in the main firmware image format, an internal signature and an external signature. The internal signature, such as the controller signature, can be defined by the controller provider and guarantee the main firmware is built by the controller provider. The external signature, such as the customer signature, can be provided to the customer for signing and guarantee the main firmware is released by the specific customer.

The main firmware image format can comprise various sections and bits. The left section of the main firmware image format can be reserved for the main firmware, followed by various bits defining the parameters for the authentication procedures.

Two-Level Signature (TLS) bit of the main firmware can indicate the authentication is one-level or two-level. If the TLS is set to 0, the optional one-level signature authentication can be provided. The main firmware image can be simplified to the controller image format 704, wherein the controller image format 704 is signed by the controller provider only. By default, the TLS can be always set to 1 when there is the customer signature saved in the SSD, indicating the two-level signature authentication. The main firmware can be authenticated by the controller provider and released by the customer. TLS can provide the flexibility for customer to have own code signing server for official firmware release.

A Test Image Indicator (TII) bit of the main firmware can indicate the firmware mode. When the TII is 0, the main firmware release can be a production release. When the TII is 1, the main firmware release can be test firmware release, wherein the firmware released is a test release instead of the production release.

Customer ID (CID) bits of the main firmware can define the customer ID for the specific customer. The number of CID bits can be variable. Each CID is corresponding to one unique customer.

Padding Parameter (PP) and Length (LENS) for RSA bits can be used in the decrypt signature algorithm. The number of PP and LENS bits can be various.

Customer Specification Configuration can contain various bits reserved for specific customer's unique features implemented in future applications.

Controller signature can refer to the controller signature encrypted and created in the firmware signing process. The controller signature can be encrypted with the controller private key and saved to the SSD.

Key Indicator bit of FIG. 6 can be configured to indicate if there is a new customer public key. When the Key indicator is 0, the customer public key previously stored in the SSD can be used for authentication. When the Key indicator is 1, a new customer public key can be provided following the Key Indicator bit, for updating the customer key pair when the customer private key is compromised. The new customer public key can be utilized in the authentication process along with a new customer signature.

In the Customer Signature section of the main firmware image format, the customer signature can be provided for the second-level signature authentication. When the new customer key is provided for updating the customer key pair, the new customer signature is also provided.

Referring now to FIG. 8, therein is shown a diagram illustrating a main firmware image format saved in a semiconductor memory system in accordance with an embodiment of the present invention. The main firmware image format saved in the semiconductor memory system is similar to the main firmware image format of FIG. 7. The Key Indicator of the main firmware image format of FIG. 7 is not saved into the semiconductor memory system, or SSD.

The controller signature and the customer signature saved into the SSD are authenticated signatures. The main firmware saved into the SSD are authenticated and ready for execution of the secure booting of the SSD.

Figure 9:
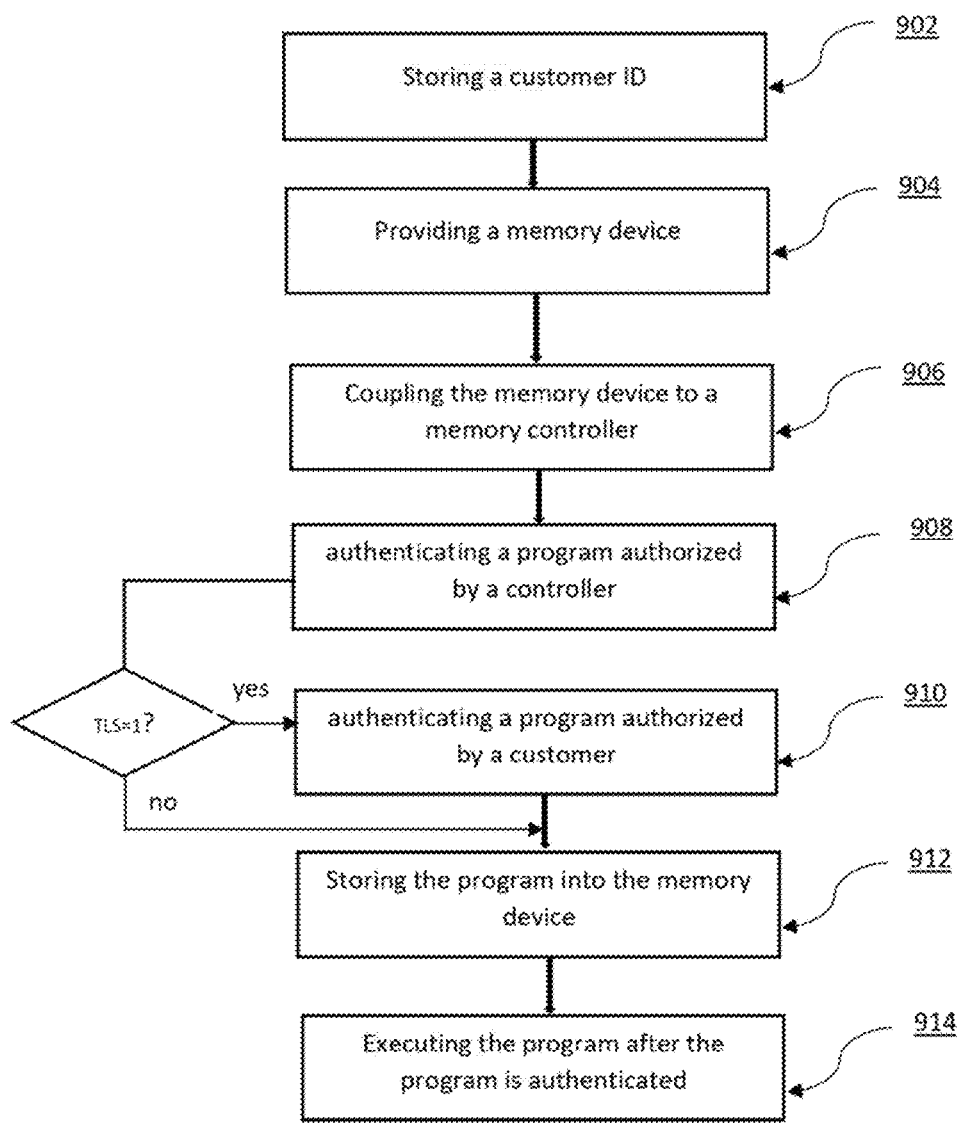
FIG. 9 is a flowchart illustrating an operating method of a semiconductor memory system in a further embodiment of the present invention.

Referring now to FIG. 9, therein is shown a flowchart illustrating an operating method of a semiconductor memory system in accordance with a further embodiment of the present invention. The method can include: storing at least a customer identification (ID) identifying a customer in a one-time-programmable memory device in a block of 902; providing a memory device in a block of 904; coupling the memory device to a memory controller including a processor, the memory controller contains instructions executed by the processor in a block of 906; authenticating whether a program is authorized by a controller provider for the customer in a first-level signature authentication, in accordance with a customer image format in a block of 908; authenticating whether the program is authorized by the customer in a second-level signature authentication, in accordance with a program image format, after the first-level signature authentication is passed, when the customer image indicates the second-level signature authentication, wherein the program image format is different than the customer image format in a block of 910; storing the program into the memory device after the first-level signature authentication and second-level signature authentication are passed in a block of 912; and executing the program after the program is authenticated in a block of 914.

The above essential elements of the embodiments of the present invention comprise a multi-level signature authentication for a secure booting of the semiconductor memory system. The benefits of the multi-level signature authentication of the embodiments of the present invention include, flexibility to allow the customers of the SSD controller provider to manage their own firmware releases with the customer key pairs, and allow to update the customer key pairs if the customer private keys are compromised. The essential elements or the technical features can secure that the main firmware runs exclusively on the SSD product for the specific customer, and reject other customer's firmware. The SSD controller provider can support multiple customers and meet the secure booting requirements individually.

Thus, it has been discovered that the semiconductor memory system of the present invention furnishes important and heretofore unknown and unavailable solutions, capabilities, and functional aspects for secure booting of the memory system. The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing integrated circuit packaging systems fully compatible with conventional manufacturing methods or processes and technologies.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto set forth herein or shown in the accompanying drawings are to be interpreted in an illustrative and non-limiting sense.

What is claimed is:

1. An operating method of a semiconductor memory system including a memory controller and a memory device, the method comprising:
    storing at least a customer identification (ID) identifying a customer in a one-time-programmable memory component of the memory controller;
    executing instructions by a processor of the memory controller for:
    authenticating whether a program is authorized by a controller provider for the customer in a first-level authentication, in accordance with a customer image format, by generating a controller signature and authenticating the controller signature with a controller public key, including matching the customer ID with a program customer ID defined in the program;
    authenticating whether the program is authorized by the customer in a second-level authentication, using a customer signature and a customer public key, after the first-level authentication is passed;
    embedding the controller public key into the memory controller during the first-level authentication;
    authenticating whether the program is authorized by the controller provider for the customer identified by the customer ID in a repeated first-level authentication after the second-level authentication is passed; and
    executing the program after the program is authenticated.

2. The method of claim 1 wherein the authenticating of whether the program is authorized by the controller provider comprises
    signing the program with a controller private key for generating the controller signature by a controller signing server.

3. The method of claim 2 wherein the
    signing the program comprises encrypting the controller private key into the controller signature, and
    authenticating the controller signature comprises decrypting the controller signature with the controller public key.

4. The method of claim 1 wherein the authenticating of whether the program is authorized by the customer comprises
    signing the program with a customer private key for generating the customer signature by a customer signing server or a controller signing server, and
    authenticating the customer signature with a customer public key.

5. The method of claim 4 wherein the
    signing the program comprises encrypting the customer private key into the customer signature, and
    authenticating the customer signature comprises decrypting the customer signature with the customer public key.

6. The method of claim 4 wherein the authenticating the customer signature comprises authenticating the customer signature with a new customer public key defined in the program, decrypting the customer signature with the new customer public key.

7. The method of claim 1 wherein the authenticating whether the program is authorized by the controller provider in the repeated first-level authentication comprises authenticating the controller signature with the embedded controller public key, decrypting the controller signature with the embedded controller public key, and matching the customer ID with the program customer ID defined in the program.

8. The method of claim 7 further comprising:
    saving the program into the memory device, after the first-level authentication, the second-level authentication, the repeated first-level authentication, or the combination thereof, is passed; and
    executing the program for a secure booting.

9. The method of claim 1 further comprising:
    saving the program into the memory device, after the first-level authentication, the second-level authentication, or the combination thereof, is passed; and
    executing the program for a secure booting.

10. The method of claim 1 further comprising:
    producing a controller key pair including a controller private key and the controller public key, and a customer key pair including a customer private key and a customer public key, by a key generation algorithm.

11. The method of claim 1 wherein the
    authenticating of whether the program is authorized by the controller provider comprises authenticating whether multiple programs are authorized by the controller provider, and
    storing at least the customer ID comprises storing multiple customer IDs for multiple customers respectively, each of the multiple customer IDs identifying a specific one of the multiple customers exclusively.

12. The method of claim 11 wherein the authenticating of whether the multiple programs are authorized by the controller provider comprises authenticating whether one of the multiple programs is authorized for one of the multiple customers exclusively.

13. A semiconductor memory system comprising:
    a memory device; and
    a memory controller, coupled to the memory device, including a processor, and a one-time-programmable memory component storing at least a customer identification (ID) identifying a customer, the memory controller containing instructions executable by the processor for:
    authenticating whether a program is authorized by a controller provider for the customer in a first-level authentication, in accordance with a customer image format, by generating a controller signature and authenticating the controller signature with a controller public key, including matching the customer ID with a program customer ID defined in the program,
    authenticating whether the program is authorized by the customer in a second-level authentication, using a customer signature and a customer public key, after the first-level authentication is passed, embedding the controller public key into the memory controller during the first-level authentication, authenticating whether the program is authorized by the controller provider for the customer identified by the customer ID in a repeated first-level authentication after the second-level authentication is passed, and executing the program after the program is authenticated.

14. The system of claim 13 wherein the program is signed with a controller private key for generating the controller signature by a controller signing server.

15. The system of claim 14 wherein the the controller private key is encrypted into the controller signature, and the controller signature is decrypted with the controller public key.

16. The system of claim 13 wherein the program is signed with a customer private key for generating the customer signature by a customer signing server or a controller signing server, and the customer signature is authenticated with a customer public key.

17. The system of claim 16 wherein the the customer private key is encrypted into the customer signature, and the customer signature is decrypted with the customer public key.

18. The system of claim 16 wherein the customer signature includes a new customer signature, wherein the new customer signature is decrypted and authenticated with a new customer public key provided in the program.

19. The system of claim 13 wherein:

one of multiple customers is identified by one of multiple customer IDs exclusively, and one of multiple programs is authenticated by the controller provider for one of the multiple customers exclusively.

* * * * *